United States Patent [19]
Yoshino et al.

[11] Patent Number: 5,212,675
[45] Date of Patent: May 18, 1993

[54] APPARATUS FOR DETECTING POSITION OF LIGHT SPOT

[75] Inventors: Junichi Yoshino; Yoshitaka Shimoda, both of Tokorozawa, Japan

[73] Assignee: Pioneer Electronic Corporation, Tokyo, Japan

[21] Appl. No.: 824,602

[22] Filed: Jan. 23, 1992

[30] Foreign Application Priority Data

Jan. 30, 1991 [JP] Japan .................... 3-009958

[51] Int. Cl.$^5$ .............................................. G11B 7/09
[52] U.S. Cl. .............................. 369/44.36; 369/44.37; 369/44.41
[58] Field of Search ............... 369/44.26, 44.28–44.34, 369/44.35–44.38, 44.41, 44.42

[56] References Cited

U.S. PATENT DOCUMENTS

| 4,787,076 | 11/1988 | Deguchi et al. | 369/44.34 |
| 5,090,004 | 2/1992 | Ohsato et al. | 369/44.37 |
| 5,140,577 | 8/1992 | Ohsato | 369/44.37 |
| 5,148,424 | 9/1992 | Wachi | 369/44.37 |
| 5,155,717 | 10/1992 | Bakx | 369/44.41 X |
| 5,159,589 | 10/1992 | Ohsato | 369/44.41 X |

FOREIGN PATENT DOCUMENTS

| 0426879 | 5/1991 | European Pat. Off. |
| 3732899 | 4/1989 | Fed. Rep. of Germany |
| 2245405 | 1/1992 | United Kingdom |

Primary Examiner—W. R. Young
Attorney, Agent, or Firm—Kane, Dalsimer, Sullivan, Kurucz, Levy, Eisele and Richard

[57] ABSTRACT

There is disclosed an apparatus for detecting position of a light spot, suitable for the tracking control or the track-jumping control at the time of reproducing an optical disk. This light spot position detector has a circuit configuration featured below. Namely, three light beams are used to provide three push-pull outputs from the respective light beams to apply a predetermined operation to those push-pull outputs, thereby to generate a light spot position signal permitting discrimination as to whether or not the light spot is in the on-track state. Further, by gain controlling the light spot position signal thus generated, a suitable signal is permitted to be outputted even when a signal is undesirably attenuated for any reason.

8 Claims, 8 Drawing Sheets

APPARATUS FOR DETECTING POSITION OF LIGHT SPOT

BACKGROUND OF THE INVENTION

This invention relates to an apparatus for detecting position of a light spot on an optical disk, and more particularly to an apparatus for detecting position of a light spot suitable for a tracking servo control or a track-jumping operation control of an Optical Memory Disk (hereinafter referred to as an OMD).

Hitherto, in the tracking control of an optical disk used exclusively for reproduction such as a compact disk, detection as to whether or not an optical spot for reading information exists on the axis (center line) of the recording track of the optical disk (hereinafter referred to as on-track detection) is conducted generally by using the method called three beam method or the push-pull method.

In accordance with the three beam method, a preceding light spot and a succeeding light spot are emitted at the positions preceding and succeeding to a light spot of an information recording and reading main beam, with predetermined spacings in a direction perpendicular to the axis direction of recording tracks (travelling direction of the light beam), respectively. Rays of reflected light obtained as the result of the fact that the above mentioned preceding and succeeding light spots are reflected on the recording surface of the optical disk are respectively detected by photodetectors to take a difference output between outputs subjected to photoelectric conversion of the detected rays of light.

In this case, if the main light beam exists on the axis of the recording track, the difference output becomes equal to zero. In contrast, if the main light beam deviates from the axis of the recording track in any direction, a difference output of a positive or negative value is produced. In order to allow the value of the difference output to be equal to zero, the positions of the light spots are controlled by employing a method of driving the object lens of the optical pick-up by using an actuator, etc., or the like method. Thus, a tracking servo control is carried out. Further, by counting the number of points at which the value of the difference output are crossing with zero (zero-cross points), the positional control at the time of the track-jumping operation can be conducted.

However, it should be noted that the above-mentioned on-track detection can be carried out by the three beam method only in connection with an optical disk exclusively used for reproduction. In such an optical disk exclusive for reproduction, a quantity of reflected light at the portion of the recording track is smaller than that at the portion subject to mirror finish because pit trains where information signals are stored are formed. Accordingly, difference outputs which are not equal to zero are provided.

However, in the case of OMD of the Write Once Read Many (WORM) type or the Erasable Direct Read After Write (E-DRAW) type, at the non-recorded portion where no information is recorded, there is hardly difference between a quantity of reflected light at the portion of the track on which information is to be recorded (which specifically called a groove in the case of the OMD) and that at the portions except for the above. Accordingly, since there are instances where the difference output becomes equal to substantially zero irrespective of whether or not the light beam is either in the on-track state or in the off-track state, it was difficult to carry out the on-track detection.

The push-pull method is known as the method permitting the on-track detection even in such a case.

In the push-pull method, a bisected or half-split photodetector is used. In accordance with the above-mentioned push-pull method, output terminals of the bisected photodetectors are connected to respective input terminals of a subtracter to take a difference output therebetween. Since the intensities are equal to each other in the case where the light beam is in the on-track state, the value of the difference output becomes equal to zero. In contrast, in the case where the light beam is in the off-track state, the difference output takes a positive or negative value. Thus, the on-track detection can be carried out similarly to the case of the three beam method.

However, even in the case where this push-pull method is used, when the disk is inclined in a radial direction thereof or the optical axis of the lens of the optical system deviates to any degree, an offset is produced in the light detection by the bisected photodetector. When such an offset is produced, even if the light spot exists on the axis of the recording track (groove), a tracking error signal serving as a difference output does not equal to zero. For this reason, an erroneous operation takes place.

In view of the above, the applicants have already proposed a system in which three light beam spots are used to take respective push-pull difference outputs between individual rays of reflected light to carry out calculation of these three push-pull difference outputs to thereby eliminate the influence of the above mentioned offset, thus to permit a satisfactory tracking servo control even at non-recorded portions (Japanese Patent Application No. 283153/90).

However, in the case where waveform shaping is applied to some degree to a tracking error signal generated in accordance with the above mentioned system to feed it back to an actuator, etc. to thereby carry out the tracking servo, if the level of a signal fed back is too low, the drivability for driving the actuator becomes insufficient. For this reason, if there is any great change in the tracking error signal, the actuator cannot follow, resulting in an erroneous operation in the servo operation. In contrast, if the level of a signal fed back is too high, the dribability of the actuator becomes too large. For this reason, a quantity of a signal subject to servo control becomes excessive, so an oscillating phenomenon takes place.

Namely, there exists a suitable or reasonable range in connection with the level of a signal to be fed back. For this reason, it is required to carry out a suitable gain control or adjustment.

When viewed from the above discussion, however, it should be noted that the tracking error signal generated by the above mentioned system (Japanese Patent Application No. 283153/90) becomes equal to a value in the vicinity of substantially zero in the case where the tracking servo control is being conducted (the tracking servo system is in a closed state). For this reason, there was the problem that it is extremely difficult to carry out gain control in the case where the tracking servo is in such a closed state.

SUMMARY OF THE INVENTION

An object of this invention is to provide an apparatus for detecting position of a light spot, which is capable of carrying out without hindrance the gain control even in the case where the tracking servo control operation is being carried out with respect to a signal indicative of position of a light spot obtained.

In accordance with one aspect of this invention, there is provided an apparatus for detecting position of a light spot in which a reflected light beam from a signal recording surface of an optical disk is used to detect whether or not a light spot exists on the axis of a recording track, the apparatus comprising:

a light emitting unit for emitting, onto the signal recording surface, a first light spot, a second light spot preceding to the first light spot with a predetermined spacing in a direction of the recording track axis and such that it is positioned with a fixed spacing in a direction perpendicular to the recording track axis, and a third light spot succeeding to the first light spot with a predetermined spacing in a direction of the recording track axis and such that it is positioned with the fixed spacing on the opposite side to the second light spot in a direction perpendicular to the recording track axis, a first photodetection unit including bisected detector surfaces, and for applying photoelectric conversion to a reflected light beam from the first light spot to output an electric signal, a second photodetection unit including bisected detector surfaces, and for applying photoelectric conversion to a reflected light beam from the second light spot to output an electric signal, a third photodetection unit including bisected detector surfaces, and for applying photoelectric conversion to a reflected light beam from the third light spot to output an electric signal, an operation unit for determining by calculation a first difference output indicative of a difference between outputs from the respective detector surfaces of the first photodetection unit, a second difference output indicative of a difference between outputs from the respective detector surfaces of the second photodetection unit, and a third difference output indicative of a difference between outputs from the respective detector surfaces of the third photodetection unit to calculate a difference between a value real number times larger than a sum of the second and third difference outputs and the first difference output to output a first light spot position signal, and to calculate a difference between the second and third difference outputs to output a second light spot position signal, and a gain control unit for controlling gain so that the value of the second light spot position signal becomes equal to a predetermined value.

In this case, the fixed spacing may be substantially one fourth of the distance between the axes of the adjacent recording tracks.

Further, the operation unit may comprises a first subtractor for calculating a difference between outputs from the respective detector surfaces of the first photodetection unit, a second subtracter for calculating a difference between outputs from the respective detector surfaces of the second photodetection unit, a third subtracter for calculating a difference between outputs from the respective detector surfaces of the third photodetection unit, an adder for calculating a sum of an output from the second subtracter and an output from the third subtracter, a multiplier for multiplying an output from the adder by a real number, a fourth subtracter for calculating a difference between the output from the second subtracter and an output from the multiplier, and a fifth subtracter for calculating a difference between the output from the second subtracter and the output from the third subtracter.

In addition, the gain control unit comprises a first voltage controlled amplifier to input a second light spot position signal to amplify the inputted second light spot position signal in accordance with a control signal inputted thereto, an operation or computing element adapted to input an output voltage from the first voltage controlled amplifier and a reference voltage set in advance to make a comparison therebetween to output a control signal corresponding to the difference to the first voltage controlled amplifier, and a second voltage controlled amplifier adapted to input a first light spot position signal and the control signal outputted from the operation element to amplify the inputted first light spot position signal in accordance with the control signal.

In accordance with one aspect of this invention thus constructed, the second light spot is emitted at a position such that no light is emitted to the recording tracks adjacent in a direction perpendicular to the recording track axis, and the third light spot is emitted with the same spacing as in the case of the second light spot on the opposite side to the second light spot with respect to the recording track axis. Thus, there occurs a phase difference between the difference output (push-pull output) $TE_{s1}$ of the second light spot and the difference output (push-pull output) $TE_{s2}$ of the third light spot. For this reason, when the first light spot position signal $TE_1$ is determined by caluculation in accordance with the following equation:

$$TE_1 = TE_M - (K/2) \times (TE_{s1} + TE_{s2})$$

(where TEM represents a first difference output, and K/2 represents a predetermined real number), and when the second light spot position signal $TE_2$ is determined by calculation in accordance with the following equation:

$$TE_2 = TE_{s1} - TE_{s2}$$

it can be dicriminated that there results the on-track state only when the first light spot position signal $TE_1$ is equal to zero and the second light spot position signal $TE_2$ takes a predetermined value. In this case, since the second light spot position signal $TE_2$ takes other values even if the first light spot position signal $TE_1$ is equal to zero, there does not result the on-track state. Accordingly, discrimination can be easily conducted. In the case of the conventional three-push-pull method, since the first and second light spot position signals $TE_{s1}$ and $TE_{s2}$ are in phase with each other, the second light spot position signal $TE_2$ is equal to zero at all times. For this reason, the on-track state cannot be detected only by the fact that the first light spot position signal $TE_1$ is equal to zero (is in a zero-cross state). On the contrary, in accordance with the above mentioned form, discrimination can be easily conducted.

Further, in the gain control unit, gain control of the above mentioned light spot position signals $TE_1$ and $TE_2$ is carried out. Even in the state where the tracking servo is brought into a closed state, so the first light spot position signal $TE_1$ becomes equal to substantially to zero, the second light spot position signal TE$_2$ indicates a negative maximal value. By making use of this fact, the gain control unit carries out the gain control so that the value of the second light spot position signal dependent upon the difference between the reflection factors of optical disks is kept at a predetermined value.

It is to be noted that the coefficient K in the above mentioned equation represents a ratio between the push-pull difference output from the main light spot and a mean value of sum of push-pull difference outputs from the preceding and succeeding light spots in the on-track state.

In addition, when the above mentioned fixed spacing is caused to be equal to a value substantially one fourth of the distance between axes of the adjacent recording tracks, it is indicated that there results the on-track state when the first light spot position signal TE$_1$ is equal to zero and the second light spot position signal TE$_2$ takes a negative maximal value.

In accordance with another aspect of this invention, there is provided a tracking servo control system in which a light spot is emitted onto a signal recording surface of an optical disk to carry out an emitting position control of a light spot emitted onto the axis of the recording track by using a reflected beam of the first mentioned emitted light spot, the system comprising:

a light emitting unit for emitting, onto the signal recording surface, a first light spot, a second light spot preceding to the first light spot with a predetermined spacing in a direction of the recording track axis and such that it is positioned with a fixed spacing in a direction perpendicular to the recording track axis, and a third light spot succeeding to the first light spot and such that it is positioned with the fixed spacing on the opposite side to the second light spot in a direction perpendicular to the recording track axis, a first photodetection unit incuding bisected detector surfaces, and for applying photoelectric conversion to a reflected light beam from the first light spot to output an electric signal, a second photodetection unit including bisected detector surfaces, and for applying photoelectric conversion to a reflected light beam from the second light spot to output an electric signal, a third photodetection unit including bisected detector surfaces, and for applying photoelectric conversion to a reflected light beam from the third light spot to output an electric signal, an operation unit for determining by calculation a first difference output indicative of a difference between outputs from the respective detector surfaces of the first photodetection unit, a second difference output indicative of a difference between outputs from the respective detector surfaces of the second photodetection unit, and a third difference output indicative of a difference between outputs from the respective detector surfaces of the third photodetection unit to calculate a difference between a value real number times larger than a sum of the second and third difference outputs and the first difference output to output a first light spot position signal, and to calculate a difference between the second and third difference outputs to output a second light spot position signal, a gain control unit for controlling gain so that the value of the second light spot position signal takes a predetermined value, an actuator for carrying out positioning of a light spot emitted by the emitting unit, and a servo control circuit adapted to input an output signal from the gain control unit to control the actuator.

In this case, the fixed spacing may be equal to substantially one fourth of the distance between the axes of the adjacent recording tracks.

Further, the operation unit may comprises a first subtracter for calculating a difference between outputs from the respective detector surfaces of the first photodetection unit, a second subtracter for calculating a difference between outputs from the respective surfaces of the second photodetection unit, a third subtracter for caluculating a difference between outputs from the respective detector surfaces of the third photodetection unit, an adder for calculating a sum of outputs from the second and third subtracters, a multiplier for amplifying an output from the adder by a real number, a fourth subtracter for calculating a difference between the output from the second subtracter and an output from the multiplier, and a fifth subtracter for calculating a difference between the outputs from the second and third subtracters.

Furthermore, the gain control unit may comprises a first voltage controlled amplifier adapted to input a second light spot position signal to amplify the inputted second light spot position signal in accordance with a contral signal inputted thereto, an operation or computing element adapted to input an output voltage from the first voltage contorlled amplifier and a reference voltage set in advance to make a comparison therebetween to output a control signal corresponding to the difference to the first voltage controlled amplifier, and a second voltage controlled amplifier adapted to input the first light spot position signal and the control signal outputted from the operation element to amplify the inputted first light spot position signal in accordance with the control signal.

In accordance with another aspect of this invention thus constructed, first, second and third light spots emitted by the emitting unit are reflected onto the signal recording surface of the optical disk, respectively. Respective reflected light beams thereof are detected by the first, second and third photodetection units and are subjected to photoelectric conversion. Outputs from the respective photodetection units are subjected to a predetermined operation at the operation unit. Thus, first and second light spot position signals are generated. Further, the first and second light spot position signals are gain controlled at the gain control unit. These gain controlled light spot position signals are outputted to the servo control circuit. The servo control circuit outputs a control signal to the actuator in correspondence with the light spot position signals which have been gain controlled. The actuator controls the emitting position of a light spot emitted by the emitting unit in accordance with the inputted control signal. Further, when the emitting position of the light spot is varied by the actuator, a new light spot position signal is generated. The control is repeated by that signal. Such a control is repeatedly carried out until a light spot emitted is correctly emitted onto the track.

Thus, not only the light spot is controlled without hindrance so that it is placed in the on-track state at the information non-recorded portion of the optical disk, but also the light spot can be placed in the on-track state without hindrance by means of the gain control unit even during the tracking servo control operation.

Further objects, features and other aspects of this invention will be understood from the following detailed description of the embodiments of this invention with reference to the drawings.

BRIEF DESCRIPTION OF THE DRAWINGS

FIG. 6(A-F) is another view for explaining the operation of the this invention.

FIG. 7(A-B) is a view for explaining an offset in the photodetector in the push-pull form.

FIG. 8(A-B) is another view for explaining an offset in the photodetector in the push-pull form.

DETAILED DESCRIPTION OF THE PREFERRED EMBODIMENT

Prior to the description of the preferred embodiment of this invention, the principle of the push-pull method and the problems therewith, and the principle of a so-called three push-pull method provided by the applicant and the problems therewith will be first described with reference to the attached drawings.

Push-pull method

Figure 7A:
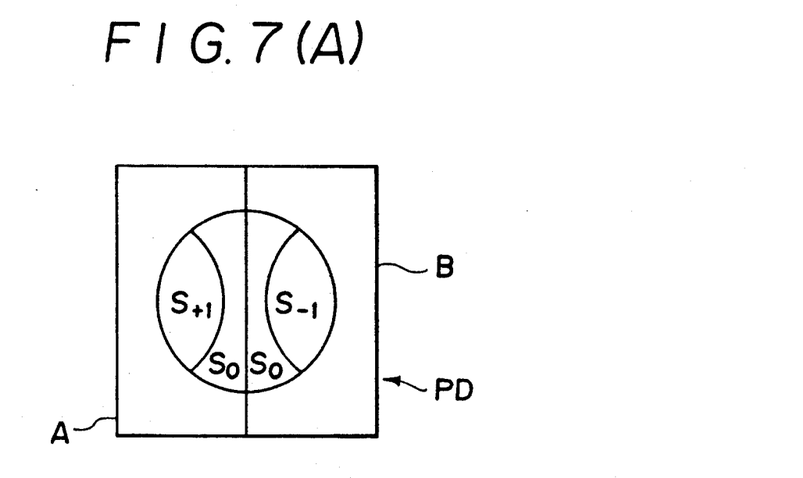

As shown in FIG. 7(A), in the push-pull method, a bisected photodetector PD is used. By unevenness due to the recording tracks (grooves) on the recording surface of the optical disk and the groove portions except for the above, the zero-th order reflected light $L_0$ and $\pm 1$st order reflected light $L_{+1}$ and $L_{-1}$ are produced. When these rays of the reflected light are emitted onto the photodetector PD, there take place the portion $S_0$ where the ray of reflected light $L_0$ is emitted as it is and the portions $S_{+1}$ and $S_{-1}$ where rays of the reflected light $L_0$ and $L_{+1}$ interfering with each other and rays of the reflected light $L_0$ and $L_{-1}$ interfering with each other are emitted, respectively. In this case, when respective output terminals of the detector surfaces A and B are connected to the input terminals of the subtracter to take a difference output, since the intensities of the portions $S_{+1}$ and $S_{-1}$ are equal to each other in the case where the light beam is in the on-track state, the value of the difference output becomes equal to zero. In contrast, in the case where the light beam is in the off-track state, the difference output takes a positive or negative value. Thus, the on-track detection can be carried out.

Figure 7B:
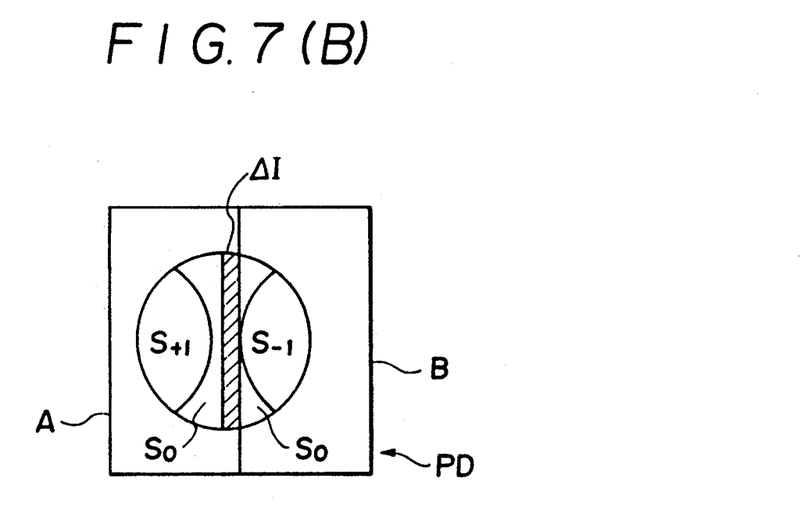
Figure 8:
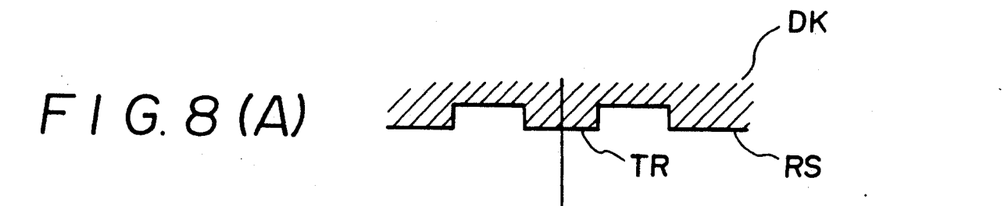

However, even in the case where the push-pull method is used, if the disk is inclined in a radial direction thereof, or there takes place any deviation in the optical axis of the lens of the optical system, an offset as indicated by $\Delta I$ in FIG. 7(B) takes place. When such an offset takes place, as shown in FIG. 8, even if the light spot exists on the axis of the recording track (groove) TR formed on the recording surface RS of the optical disk DK, the tracking error signal TEc serving as a difference output produces an error of $2\Delta I$ and therefore does not becomes equal to zero. As a result, there occurs an erroneous operation in the tracking control.

3-push-pull method

In view of the above, the applicants have already proposed a system in which three light beam spots are used to take respective push-pull difference outputs with respect to individual rays of reflected light to perform calculation of these three push-pull difference outputs to thereby eliminate the influence of the above mentioned offset thus to permit a satisfactory tracking servo control even at the non-recorded track portion (Japanese Patent Application No. 283153/90).

However, in the case where waveform shaping is applied to some degree to a tracking error signal generated in accordance with the above mentioned system to feed the tracking error signal subjected to waveform shaping in this way back to an actuator, etc. to thereby carry out the tracking servo control, if the level of a signal fed back is too low, the drivability for driving the actuator becomes insufficient. For this reason, in the case where the tracking error signal changes to much degree, the operation of the actuator dose not follow this, resulting in an erronerous operation in the servo operation. In contrast, if the level of a signal fed back is too high, the drivability of the actuator becomes too large, so the quantity of a signal subjected to servo control becomes excessive. Thus, any oscillating phenomenon undesirably takes place. Namely, since there exists a suitable or reasonable range in the level of a signal fed back, it is required to suitably carry out gain control.

Figure 6A:
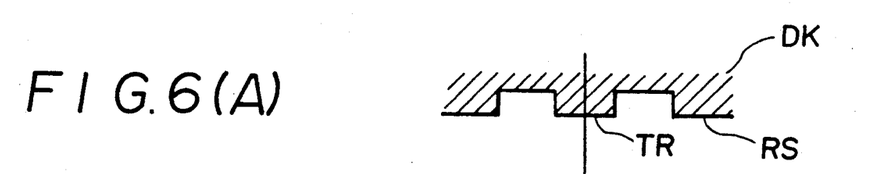
Figure 6B:
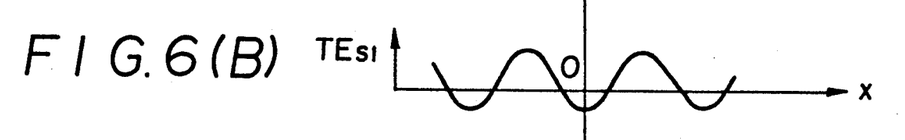
Figure 6C:
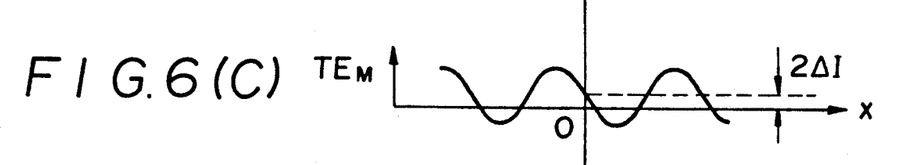
Figure 6D:
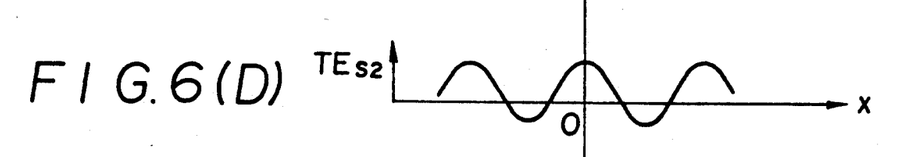
Figure 6E:
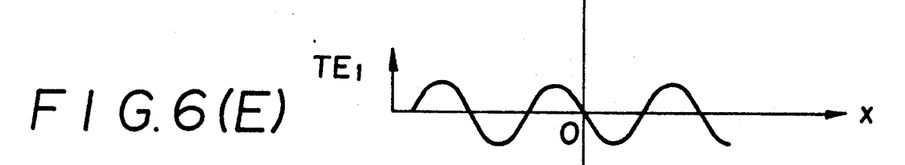
Figure 9:
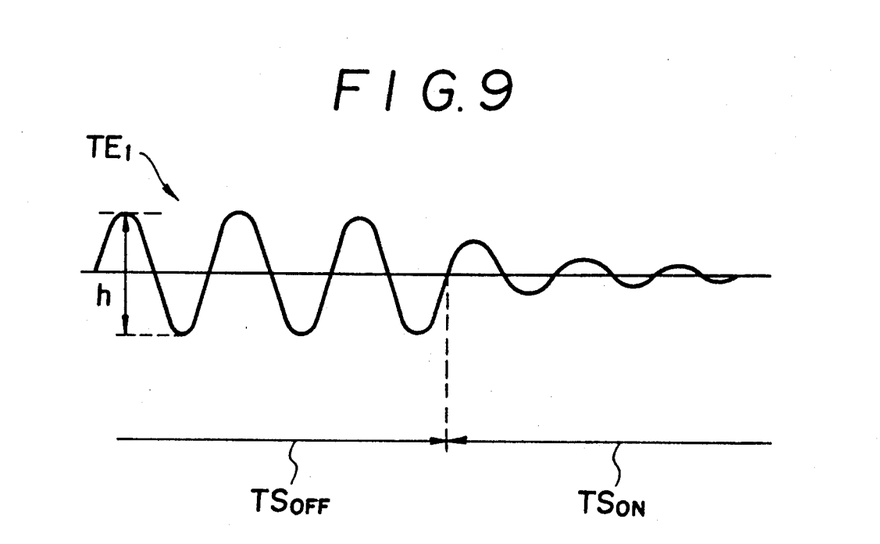
FIG. 9 is a view for explaining the problems at the time of a conventional tracking servo control.

In this connection, the first tracking error signal $TE_1$ generated in accordance with the above mentioned system (Japanese Patent Application No. 283153/90) has the characteristic as shown in FIG. 6(E). Accordingly, it is sufficient to carry out gain control on the basis of the value of h of $TE_1$ at the time period $TS_{OFF}$ during which the tracking servo system is in the OFF state as shown in FIG. 9. However, there was the problem that since the value of h takes a value in the vicinity of substantially zero at the time period $TS_{ON}$ during which the tracking servo control is being conducted (the tracking servo system is in a closed state), it becomes extremely difficult to carry out gain control in the case where the traking servo is in such a closed state).

Principle of this invention

The principle of this invention proposed in order to contemplate solving the above mentioned problems will now be described with reference to FIG. 1.

Figure 1:
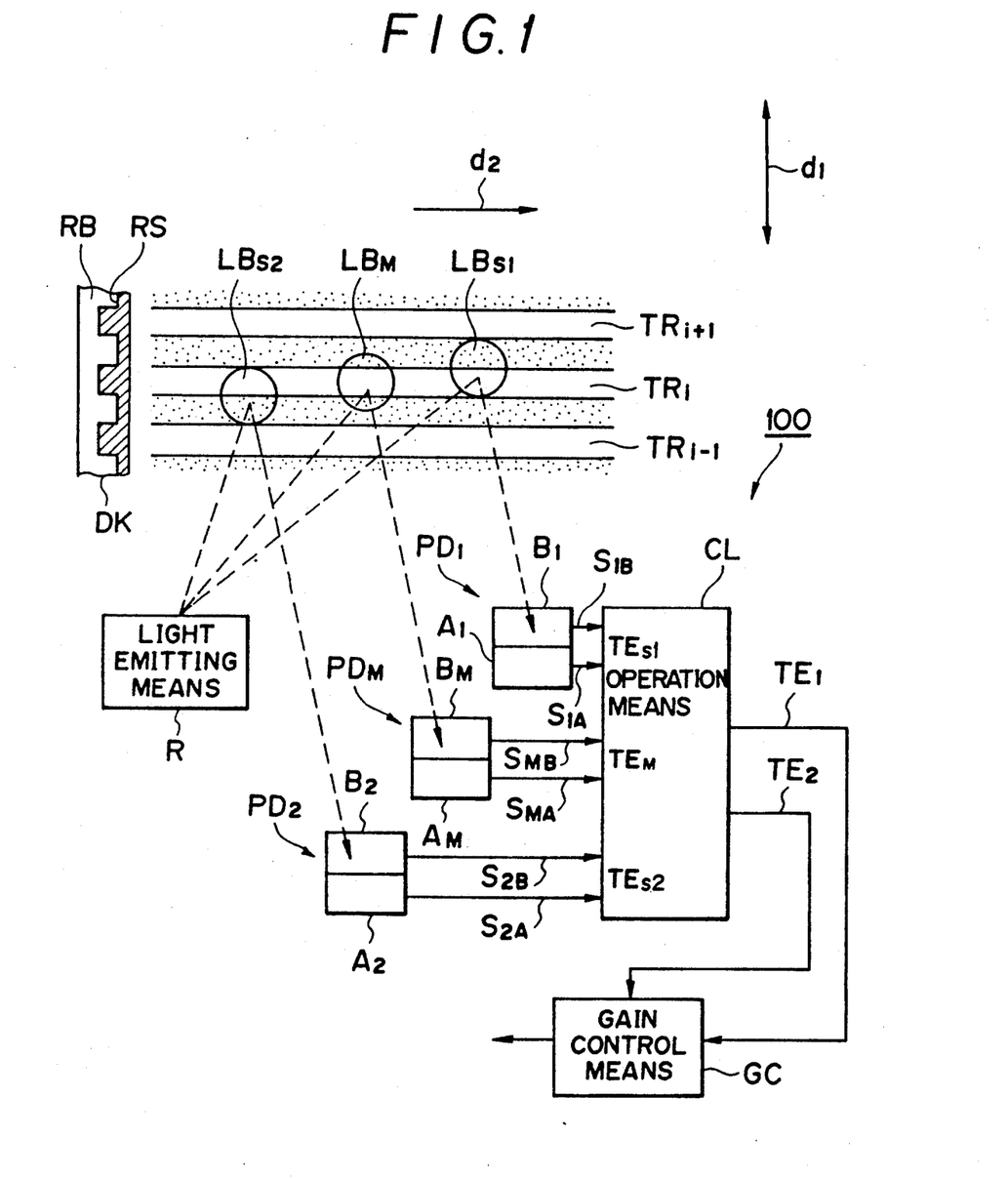
FIG. 1 is an explanatory view for explaining the principle of this invention.

In FIG. 1, a reference symbol DK represents an optical disk in which a signal recording surface RS is formed on a base plate RB, and a partial cross section thereof is shown. Reference symbols $TR_{i+1}$, $TR_i$ and $TR_{i-1}$ represent recording tracks formed on the optical disk and the state thereof when viewed from the above is shown. Further, a reference symbol d1 represents a radial direction of the optical disk with respect to the recording tracks and a reference symbol d2 represents a travelling direction of a light spot emitted with respect to the recording tracks. In addition, a reference numeral 100 represents an apparatus for detecting position of a light spot according to this invention.

The light spot position detecting apparatus 100 of this invention is directed to a light spot position detector 100 in which a reflected light beam from the signal recording surface RS of the optical disk DK is used to detect whether or not a light spot exists on the recording track axis. This light spot position detector 100 comprises a light emitting means R for emitting, onto the signal recording surface RS, a first light spot $LB_M$, a second light spot $LB_{s1}$ preceding to the first light spot $LB_M$ with a predetermined spacing in a direction of the recording track axis and such that it is positioned with a fixed spacing in a direction perpendicular to the recording track axis, and a third light spot $LB_{s2}$ succeeding to the first light spot with a predetermined spacing in a direction of the recording track axis and such that it is positioned with the fixed spacing on the opposite side to the second light spot $LB_{s1}$ in a drection perpendicular to the recording track axis; a first photodetection means $PD_M$ including bisected detector surfaces $A_M$ and $B_M$, and for applying photoelectric conversion to a reflected light beam from the first light spot LBM to output an electric signal; a second photodetection means PD1 including bisected detector surfaces A1 and B1, and for applying photoelectric conversion to a reflected light beam from the second light spot $LB_{s1}$ to output an electric signal; a third photodetection means $PD_2$ including bisected detector surfaces A2 and B2, and for applying photoelectric conversion to a reflected light beam from the third light spot $LB_{s2}$; an operation means CL for determining by calculation a first difference output $TE_M$ indicative of a difference between outputs $S_{MA}$ and $S_{MB}$ from the respective detector surfaces $A_M$ and $B_M$ of the first photodetection means $PD_M$, a second difference output $TE_{s1}$ indicative of a difference between outputs $S_{1A}$ and $S_{1B}$ from the respective detector surfaces $A_1$ and $B_1$ of the second photodetection means PD1, and a third difference output TEs2 indicative of difference between outputs $S_{2A}$ and $S_{2B}$ from the respective detector surfaces $A_2$ and $B_2$ of the third photodetection means $PD_2$ to calculate a value real number (K/2) times larger than a sum of the second and third difference outputs $TE_{s1}$ and $TE_{s2}$, which is expressed by the following equation:

$$(K/2) \times (TE_{s1} + TE_{s2})$$

to calculate a difference between the above value and the first difference output $TE_M$ to output a first light spot position signal $TE_1$, and to calculate a difference between the second and third difference outputs $TE_{s1}$ and $TE_{s2}$ to output a second light spot position signal $TE_2$; and a gain control means GC for controlling gain so that the value of the second light spot position signal $TE_2$ becomes equal to a predetermined value.

In accordance with the light spot position detector 100 thus constructed, the second light spot $LB_{s1}$ is emitted at the position where no light is emitted onto the recording tracks adjacent in a direction perpendicular to the recording tracks, and the third light spot $LB_{s2}$ is emitted with the same spacing as in the case of the second light spot on the opposite side to the second light spot $LB_{s1}$ with respect to the recording track axis. Thus, there is produced a phase difference between the difference output (push-pull output) $TE_{s1}$ of the second light spot and the difference output (push-pull output) $TE_{s2}$ of the third light spot. For this reason, when the first light spot position signal $TE_1$ is determined by cauculation in accordance with the following equation:

$$TE_1 = TE_M - (K/2) \times (TE_{s1} + TE_{s2})$$

where $TE_M$ represents a first difference output, and K/2 represents a predetermined real number, and when the second light spot position signal $TE_2$ is determined by the following equation:

$$TE_2 = TE_{s1} - TE_{s2}$$

it can be dicriminated that only when the first light spot position signal $TE_1$ is equal to zero, and the second light spot position signal $TE_2$ takes a predetermined value, there results the on-track state. Since there dose not result the on-track state in the case where the second light spot position signal takes other values even if the first light spot position signal $TE_1$ is equal to zero, discrimination can be easily carried out.

Further, at the gain control means, gain control of the first and second light spot position signals is carried out. Also in the state where the tracking servo system is caused to be brought into a closed state, so the first light spot position signal $TE_1$ becomes equal to substantially zero, the second light spot position signal $TE_2$ indicates a negative maximal value. By making use of this fact, the gain control means carries out gain control so that the value of the second light spot position signal dependent upon the difference between reflection factors of optical disks is kept at a predetermined value.

It is to be noted that K in the above equation represents a ratio between the push-pull difference output from the main light spot and a mean value of a sum of the push-pull difference outputs from the preceding and succeeding light spots in the on-track state.

In addition, when the above mentioned fixed spacing is caused to be equal to a value substantially one fourth of the distance between the axes of the recording tracks, it is indicated that there results the on-track state when the first light spot position signal $TE_1$ is equal to zero and the second light spot position signal $TE_2$ takes a negative maximal value.

A preferred embodiment of this invention will now be described with reference to the attached drawings.

Figure 2:
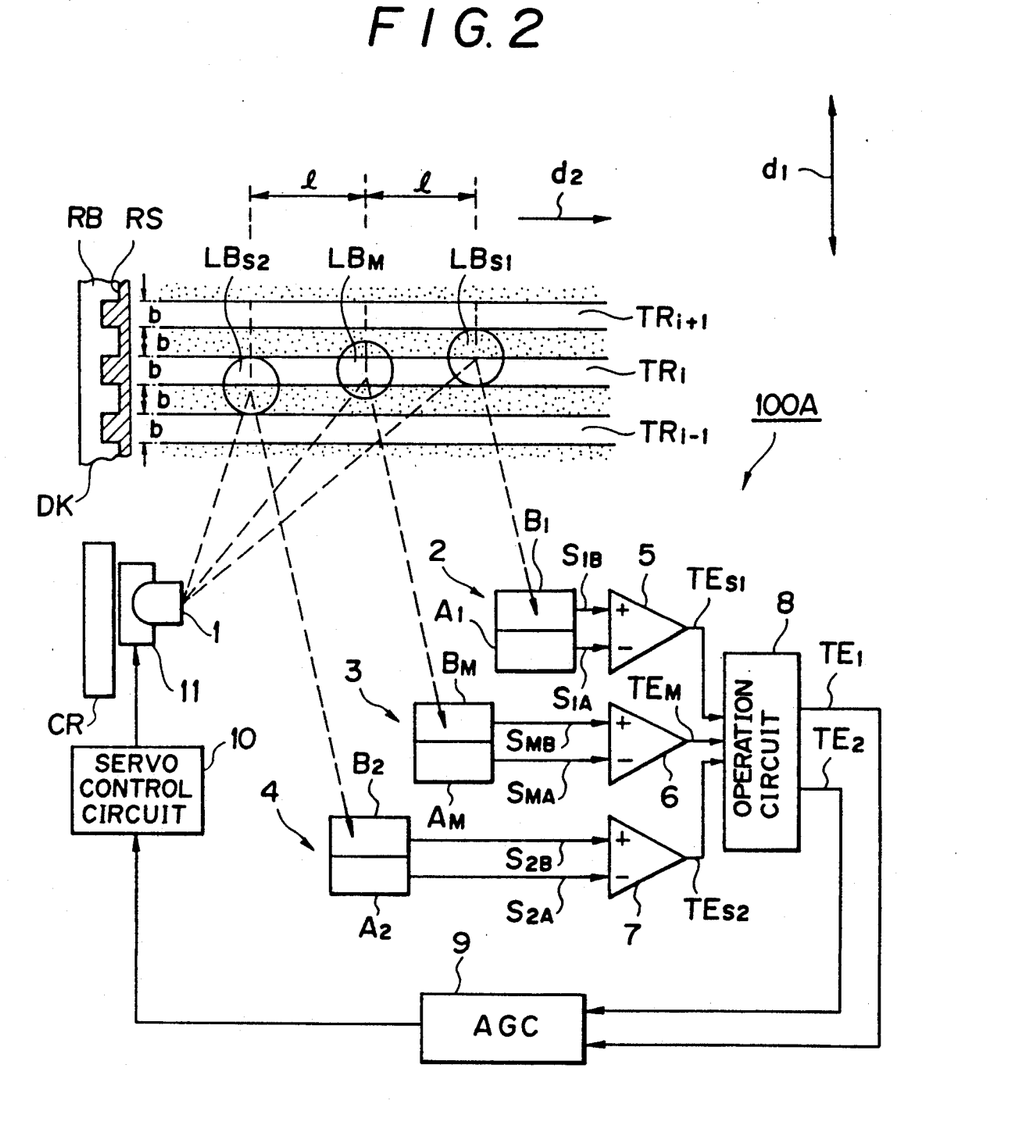
FIG. 2 is a view showing the cofiguration of an embodiment of this invention.

FIG. 2 is a view showing the configration of the embodiment of this invention. In this figure, reference numeral 100A represents a tracking servo control system constituting a light spot position detector according to this invention.

This tracking servo control system 100A comprises a layer light source 1 serving as the light emitting means, a bisected photodetector 3 serving as the first photodetection means, a bisected photodetector 2 serving as the second photodetection means, a bisected photodetector 4 serving as the third photodetection means, subtracters 5, 6 and 7, an operation circuit 8, an automatic gain ontrol (AGC) circuit 9, a servo control circuit 10, and an actuator 11. Here the subtracters 5, 6 and 7 and the operation circuit 8 constitute the operation means. Further, the automatic gain control circuit 9 corresponds to the gain control means. In addition, the laser light source 1, the bisected photodetectors 2, 3 and 4, the subtracters 5, 6 and 7, the operation circuit 8 and the automatic gain control circuit 9 constitute the light spot position detector.

The laser light source 1 is comprised of optical parts such as laser diode, lens, and half mirror, etc., and serves to emit light spots $LB_M$, $LB_{s1}$ and $LB_{s2}$ as shown onto the recording track $TR_1$ on the signal recording surface of the optical disk DK. The object lens of the laser light source 1 is set by the actuator 11 so that fine position control can be carried out. Further, the light sorce 1 itself can be moved in a radial direction of the disk by the carrige CR. In addition, for the actuator, an electromagnetic coil is ordinarily used.

In the light spots emitted from the laser light source 1, the main light spot $LB_M$ serving as the first light spot is emitted onto the axis of the recording track (groove) $TR_i$. The preceding light spot $LB_{s1}$ serving as the second light spot is emitted at a position preceding by a fixed spacing l in a direction of the recording track axis from respective recording track widths and portions outside the the main light spot $BL_M$ and spaced by a fixed interval b/2 to the recording track $TR_{i+1}$ side in a direction perpendicular to the recording track axis. In this case, recording tracks are values b equal to each other. Further, the diameter of the light spot is 2b. Accordingly, as shown, the outer peripheral portion of light of the preceding light spot $LB_{s1}$ is such that it is not emitted onto the adjacent recording track $TR_{i+1}$. In addition, the succeeding light spot $LB_{s2}$ serving as the third light spot is emitted at a position succeeding by a fixed interval l in a direction of the recording track axis from the main light spot $LB_M$ and spaced by a fixed interval b/2 to the recording track $TR_{i-1}$ side in a direction perpendicular to the recording track axis. The outer peripheral portion of light of the succeeding light spot $LB_{s2}$ is also such that it is not emitted onto the adjacent recording track $TR_{i-1}$.

The bisected photodetector 3 is of a structure including detector surfaces $A_M$ and $B_M$ and such that the direction of the divisional line of the detector surface is in parallel to the axis direction of the recording track. The output terminal of the detector surface $A_M$ is connected to the negative input terminal of the subtracter 6, and the output terminal of the detector surface $B_M$ is connected to the positive side input terminal thereof. The bisected photodetector 2 is of a structure including detector terminal of the detector surface $A_1$ is connected to the surfaces $A_1$ and $B_1$ and such that the direction of the divisional line of the detector surface is in parallel to the axis direction of the recording track. The output negative input terminal of the subtracter 5, and the output terminal of the detector surface $B_1$ is connected to the positive input terminal of the subtracter 5. In addition, the bisected photodetector 4 is of a structure including detector surfaces $A_2$ and $B_2$ and such that the direction of the divisional line of the detector surface is in parallel to the axis direction of the recording track. The output terminal of the detector surface $A_2$ is connected to the negative input terminal of the subtracter 7, and the output terminal of the detector surface $B_2$ is connected to the positive terminal of the subtracter 7. The output terminals of these subtracters 5, 6 and 7 are connected to the input terminal of the operation circuit 8.

Figure 3:
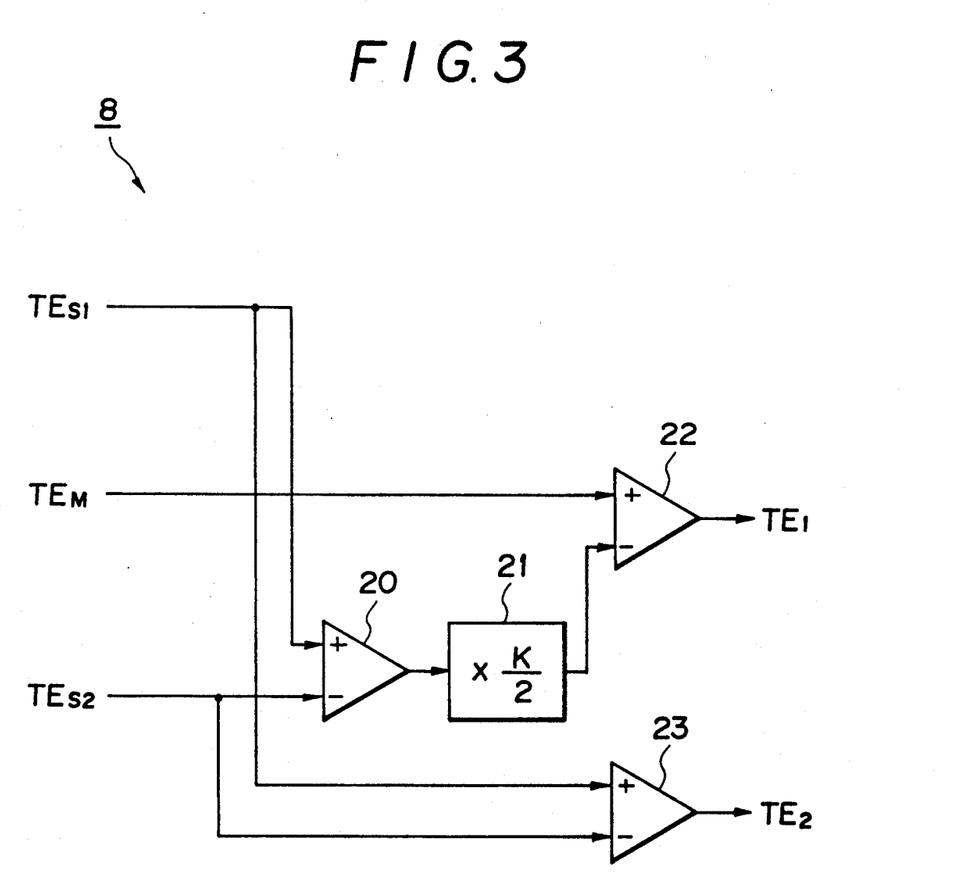
FIG. 3 is a circuit diagram showing the detailed configuration of the operation circuit in FIG. 2.

FIG. 3 is a circuit diagram showing the detail of the operation circuit 8. As shown in this figure, this operation circuit 8 comprises an adder 20 for calculating a sum of an output $TE_{s1}$ from the subtracter 5 and an output $TE_{s2}$ from the subtracter 7, a multiplier 21 for multiplying an output from the adder 20 by a real number, a subtracter 22 for calculating a difference between an output from the multiplier 21 and an output $TE_M$ from the subtracter 6 to output a difference signal $TE_1$, and a subtracter 23 for calculating a difference between the output $TE_1$ from the subtracter 5 and the output $TE_{s2}$ from the subtracter 7 to output a difference signal $TE_2$.

Figure 5:
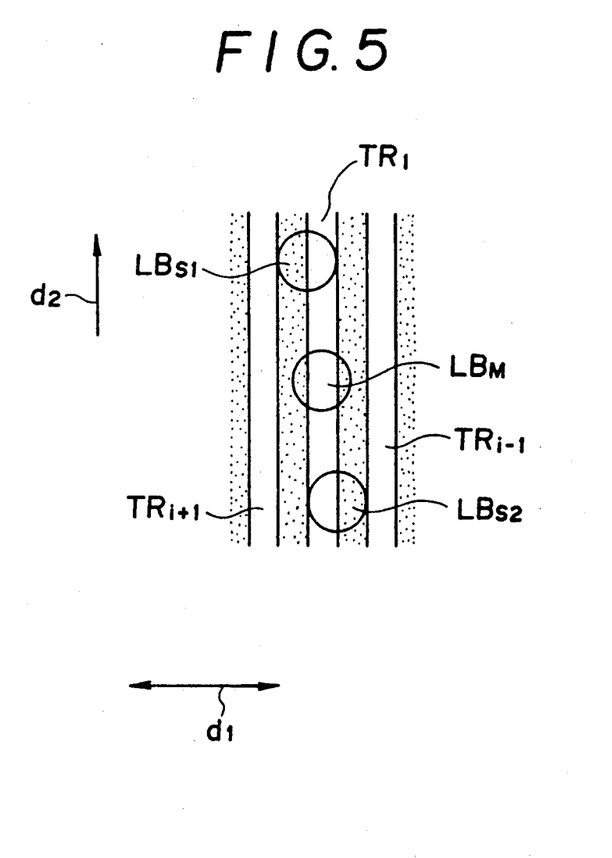
FIG. 5 is a view for explaining the operation of this invention.

The operation of the tracking servo control system 100A calculating a difference between the output $TE_1$ from the subtracter 5 and the output $TE_{s2}$ from the subtracter 7 to output a difference signal $TE_2$. will now be described with refernce to FIGS. 2, 5 and 6.

A reflected light from the main light spot $LB_M$ is detected by the bisected photodetector 3, and is subjected to photoelectric conversion. As a result, an output $S_{MA}$ is outputted from the detector surface $A_M$ to the subtracter 6, and an output SMB is outputted from the detector surface $B_M$ to the subtracter 6. Thus, the subtracter 6 performs calulation expressed by the following equation:

$$TE_M = S_{MB} - S_{MA}$$

The output $TE_M$ corresponds to a first difference output. FIG. 6(C) is a graphical representation of a curve indicative of this difference output (push-pull output) $TE_M$ with the x-axis perpendicular to the recording track axis being taken on the abscissa. This curve is a sinusoidal curve. In this case, an offset $2\Delta I$ is produced.

Further, a reflected light from the preceding light spot $LB_{s1}$ is detected by the bisected photodetector 2, and is subjected to photoelectric convrsion. As a result, an output $S_{1A}$ is outputted from the detector surface $A_1$ to the subtracter 5, and an output $S_{1B}$ is outputted from the detector surface $B_1$ to the subtracter 5. Thus, the subtracter 5 performs caluculation expressed by the following equation:

$$TE_{s1} = S_{1B} - S_{1A}$$

The output $TE_{s1}$ corresponds to a second difference output. FIG. 6(B) is a graphical representation of a curve indicative of this difference output (push-pull output) $TE_{s1}$ with the x-axis perpendicular to the recording track axis being taken on the abscissa. This curve is a sinusoidal curve different from the curve $TE_M$ only in the phase.

In addition, a reflected light from the succeeding light spot $LB_{s2}$ is detected by the bisected photodetector 4, and is subjected to photoelectric conversion. As a result, an output S2A is outputted from the detector surface $A_2$ to the subtracter 7, and an output $S_{2B}$ is outputted from the detector surface $B_2$ to the subtracter 7. Thus, the subtracter 7 performs calculation expressed by the following equation:

$$TE_{s2} = S_{2B} - S_{2A}$$

The output $TE_{s2}$ coreesponds to a third difference output. FIG. 6(D) is a graphical representation of a curve with the x-axis perpendicular to the recording track axis being taken on the abscissa. This curve is a sinusoidal curve different emitted as in this embodiment, there is produced a phase from the curve $TE_M$ only in the phase. As seen from FIGS. 6(B) and (D), when the light spots $LB_M$, $LB_{s1}$ and $LB_{s2}$ are difference of 180 degrees between the difference outputs $TE_{s1}$ and $TE_{s2}$. Then, the operation circuit 8 performs caluculation expressed by the following equations:

$$TE_1 = TE_M - (K/2) \times (TE_{s1} + TE_{s2}), \text{ and}$$

$$TE_2 = TE_{s1} - TE_{s2}$$

Figure 6F:
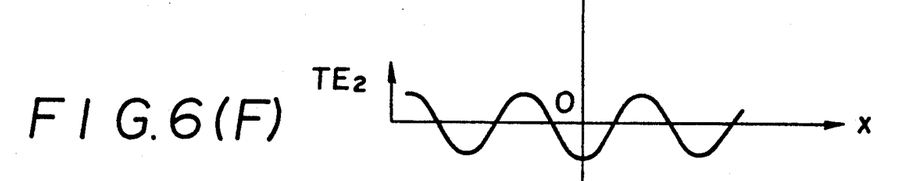

Thus, the operation circuit 8 outputs $TE_1$ and $TE_2$ as the first and second light spot position signals, respectively. In the above equation, K represents a ratio between a quantity of rays of reflected light from the main light spot and a quantity of rays of reflected light from the preceding or succeeding light spot. The waveforms of $TE_1$ and $TE_2$ are as shown in FIGS. 6(E) and (F), respectively. As seen from this figure, with respect to the signal $TE_1$, the offset $2\Delta I$ is eliminated therefrom. Since there is a phase difference of 180 degrees between $TE_{s1}$ and $TE_{s2}$, the value of the signal $TE_2$ dose not equal to zero. From this curve considered to be as a sinusoidal curve, the offset of $2\Delta I$ included in $TE_{s1}$ and $TE_{s2}$ are eliminated. In the case where the main light spot $LB_M$ is in the on-track state, the signal $TE_2$ indicates a negative maximal value. This maximal value is not subjected to the influence of the offset of $2\Delta I$ due to deviation of the light spot. Thus, by serching the case where the signal $TE_1$ is equal to zero and the signal $TE_2$ is equal to N (N<0), the track-jumping operation can be carried out.

As stated above, three light beam spots are used to take respective push-pull difference outputs with respect to individual rays of reflected light to carry out calculation of the three push-pull difference outputs to thereby provide light spot position signals $TE_1$ and $TE_2$ from which the influence of the offset encountered with the push-pull method is eliminated, thus making it possible to carry out a satisfactory tracking servo control even at the portions where no information is recorded.

Further, in this embodiment, the first light spot position signal $TE_1$ and the second light spot position signal $TE_2$ are inputted to the automatic gain control circuit 9. At the automatic gain control circuit 9, gain control is carried out so that the value of the second light spot position signal $TE_2$ becomes equal to a predetermined value, and the first light spot position signal $TE_1$ is gain controlled by the gain control of the second light spot position signal $TE_2$. As a result, the first light spot position signal thus gain cntrolled is outputted as an error signal of the light spot position. That output is then outputted as an output of the light spot position detector to the servo control circuit 10, and is fed back to the actuator 11.

Figure 4:
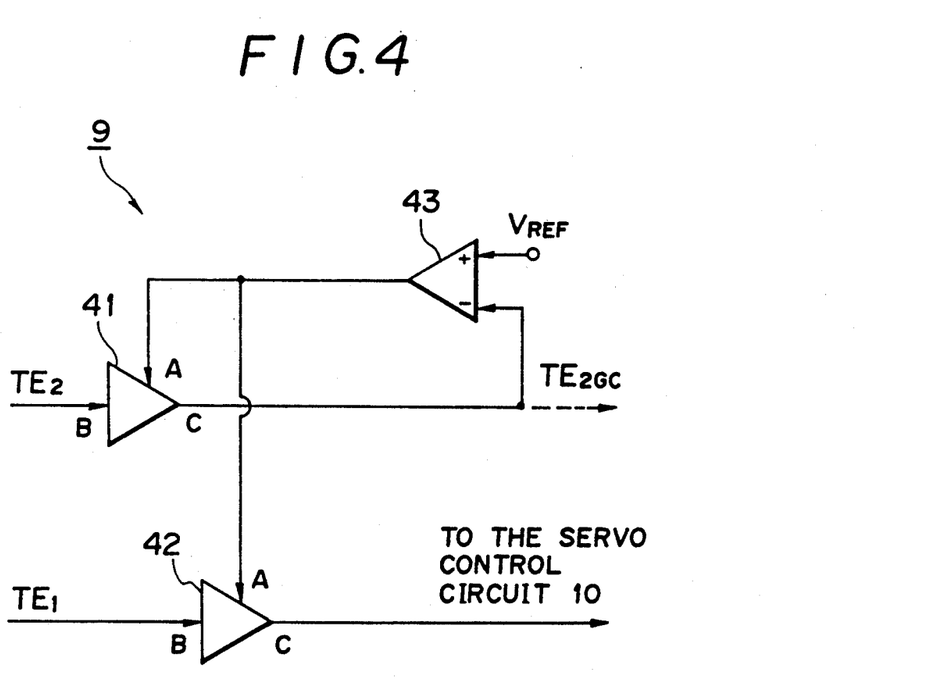
FIG. 4 is a circuit diagram showing an example of the configuration of the automatic gain control circuit in FIG. 2.

FIG. 4 is a circuir diagram showing the automatic gain control circuit 9. As shown in this figure, the automatic gain control circuit 9 comprises voltage controlled amplifiers 41 and 42 each having a control input terminal A, an input terminal B, and an output terminal C, an operation or computing element 43. The voltage controlled amplifiers 41 and 42 are an amplifier such that the gain is varied by a voltage value inputted to the control input terminal A. The second light spot position signal $TE_2$ is inputted to the input terminal B of the voltage controlled amplifier 41, and an output from the operation element 43 is inputted to the control input terminal A thereof. Thus, the signal $TE_2$ inputted thereto is amplified in accordance with an output from the operation element 43 inputted as a control signal and is outputted therefrom. The output voltage of the voltage controlled amplifier 41 and a reference voltage $V_{REF}$ set in advance are inputted to the operation element 43. Thus, the operation element 43 makes a comparison therebetween to output a control signal corresponding to that difference to each of the control signals A of the voltage controled amplifiers 41 and 42. Accordingly, the second light spot position signal $TE_2$ is gain controlled with respect to the reference voltage $V_{REF}$. Thus, a control signal corresponding to that difference is generated.

On the other hand, the first light spot position signal $TE_1$ is inputted to the input terminal B of the voltage controlled amplifier 42, and a control signal which is an output from the operation element 43 is inputted to the control input terminal A thereof. Thus, the first light spot position signal $TE_1$ is amplified in accordance with a control signal outputted from the operation element 43, and is outputted therefrom. Accordingly, the first light spot position signal $TE_1$ is gain controlled by the second light spot position signal $TE_2$. Namely, when the level of the second light spot position signal $TE_2$ is small, the first light spot position signal $TE_1$ is amplified to much degree, so the signal $TE_1$ greatly amplified is outputted therefrom. On the contrary, when the second light spot position signal $TE_2$ has the same level as that of the reference voltage $V_{REF}$, the first light spot position signal $TE_1$ is outputted without hardly undergoing amplification. In this embodiment, there is employed a circuit configuration such that an output from the voltage controlled amplifier 42 is outputted to the servo control circuit 10. It is to be noted that an output $TE_{2GC}$ gain controlled at the voltage controlled amplifier 41 may be used as the on-track signal.

Since the automatic gain control circuit 9 is operated in this way, the gain control is conducted as shown in FIG. 9. Namely, even if the light spot position signals $TE_1$ and $TE_2$ are attenuated at the time of the tracking servo control operation, the second light spot position signal $TE_2$ is gain controlled by the voltage controlled amplifier 41 and the operation element 43 with respect to the reference voltage, and the first light spot position signal $TE_1$ is gain controlled at the voltage controlled amplifier 42 by a control signal obtained by the gain control of the second light spot position signal $TE_2$. The signal $TE_1$ thus gain controlled is outputted to the servo control circuit 10. Thus, control of the light spot position is carried out. Accordingly, even in the case where the tracking servo control operation is being carried out, the gain control is conducted without hindrance. Thus, an expected tracking servo control is satisfactorily carried out.

It is to be noted that it is not limited that the servo control system according to this invention has the configuration and the operation as in the above described embodiment.

For example, the subtracters 5, 6 and 7 may be operative not only to subtract the A side output from the B side output, but also to subtact the B side output from the A side output. Further, the second light spot position signal $TE_2$ may be a signal defined by the following equation:

$$TE_{2A} = TE_{s2} - TE_{s1}$$

In this case, the zero cross point is the point where the second light spot position signal $TE_2$ indicates positive maximal value.

It is to be noted that, in the above described embodiment, when there is employed an approach to take a sum output of outputs $S_{1A}$ and $S_{1B}$ from the respective detector surfaces $A_1$ and $B_1$ of the photodetector 2 by using an adder to assume it as a sum output $SUM_1$, to take a sum output of outputs $S_{2A}$ and $S_{2B}$ from the respective detector surfaces $A_2$ system may be readily used as an ordinary light spot and $B_2$ of the photodetector 4 by using an adder to assume it as a sum output $SUM_2$, and to take a difference $(SUM_1 - SUM_2)$ or $(SUM_2 - SUM_1)$ between the sum outputs $SUM_1$ and SUM$_2$, this position detector based on the three-beam method. In order to use this system in a manner stated above, it is sufficient to add an IC for the operation circuit, or the like. It is possible to easily cope with this implementation. By employing such a configuration, even in the case of ordinary optical disks exclusively used for reproduction such as compact disks or laser video disks, etc., compatibility can be maintained by switching of the circuit. It is possible to cope with such an implementation by a more simple circuit configuration.

In addition, while there is employed in the above described embodiment the configuration that both the preceding and succeeding light spots are not emitted onto the adjacent recording tracks, these light spots may be emitted onto the adjacent tracks. Also in this case, the first and second light spot position signals TE$_1$ and TE$_2$ can be provided.

As described above, in accordance with this invention, the on-track detection can be carried out without hindrance also with respect to the track portions where no information is recorded of the optical disk. In addition, gain control can be advantageously conducted even during the operation of the tracking servo control by making use of the gain control means. Thus, the light spot position can be precisely controlled.

The invention may be embodied in other specific forms without departing from the spirit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for detecting position of a light spot in which a reflected light beam from a signal recording surface of an optical disk is used to detect whether or not a light spot exist on an axis of a recording track, said apparatus comprising:

light emitting means for emitting, onto said signal recording surface, a first light spot, a second light spot preceding to said first light spot with a predetermined spacing in a direction of said recording track axis and such that it is positioned with a fixed spacing in a direction perpendicular to said recording track axis, and a third light spot succeeding to said first light spot with a predetermined spacing in a direction of said recording track axis and such that it is positioned with the fixed spacing on the opposite side to said second light spot in a direction perpendicular to said recording track axis, first photodetection means including bisected detector surfaces for applying photoelectric conversion to a reflected light beam from said first light spot to output an electric signal, second photodetection means including bisected detector surfaces for applying photoelectric conversion to a reflected light beam from said second light spot to output an electrical signal, third photodetection means including bisected detector surfaces for applying photoelectric conversion to a reflected light beam from said third light spot to output an electric signal, operation means for determining by calculation a first difference output indicative of a difference between outputs from said respective detector surfaces of said first photodetection means, a second difference output indicative of a difference between outputs from said respective detector surfaces of said second photodetection means, and a third difference output indicative of a difference between outputs from said respective detector surfaces of said third photodetection means to calculate a difference between a value real number times larger than a sum of said second and third difference outputs and the first difference output to output a first light spot position signal, and to calculate a difference between said second and third difference outputs to output a second light spot position signal, and gain control means for controlling gain so that the value of said second light spot position signal becomes equal to a predetermined value.

2. An apparatus for detecting position of a light spot as set forth in claim 1, wherein said fixed spacing may be substantially one fourth of the distance between the axes of the adjacent recording tracks.

3. An apparatus for detecting position of a light spot as set forth in claim 1, wherein said operation means comprises:

a first subtracter for calculating a difference between outputs from the respective detector surfaces of said first photodetection means, a second subtracter for calculating a difference between outputs from the respective detector surfaces of said second photodetection means, a third subtracter for calculating a difference between outputs from the respective detector surfaces of said third photodetection means, an adder for calculating a sum of an output from said second subtracter and an output from said third subtracter, a multiplier for multiplying an output from said adder by a real number, a fourth subtracter for calculating a difference between said output from said first subtracter and an output from said multiplier, and a fifth subtracter for calculating a difference between said output from said second subtracter and said output from said third subtracter.

4. An apparatus for detecting position of a light spot as set forth in claim 1, wherein said gain control means comprises:

a first voltage controlled amplifier to input a second light spot position signal to amplify the inputted second light spot position signal in accordance with a control signal inputted thereto, an operation or computing element adapted to input an output voltage from said first voltage controlled amplifier and a reference voltage set in advance to make a comparison therebetween to output a control signal corresponding to the difference to said first voltage controlled amplifier, and a second voltage controlled amplifier adapted to input a first light spot position signal and the control signal outputted from said operation means to amplify the inputted first light spot position signal inputted in accordance with said control signal.

5. A tracking servo control system in which a light spot is emitted onto a signal recording surface of an optical disk to carry out an emitting position control of a light spot emitted onto an axis of a recording track by using a reflected beam of said first mentioned emitted light spot, said system comprising:

light emitting means for emitting, onto said signal recording surface, a first light spot, a second light spot preceding to said first light spot with a predetermined spacing in a direction of said recording track axis and such that it is positioned with a fixed spacing in a direction perpendicular to said recording track axis, and a third light spot succeeding to said first light spot and such that it is positioned with said fixed spacing on the opposite side to said second light spot in a direction perpendicular to said recording track axis, first photodetection means including bisected detector surfaces for applying photoelectric conversion to a reflected light beam from said first light spot to output an electric signal, second photodetection means including bisected detector surfaces for applying photoelectric conversion to a reflected light beam from said second light spot to output an electric signal, third photodetection means including bisected detector surfaces for applying photoelectric conversion to a reflected light beam from said third light spot to output an electric signal, operation means for determining by calculating a first difference output indicative of a difference between outputs from the respective detector surfaces of said first photodetection means, a second difference output indicative of a difference between outputs from said respective detector surfaces of said second photodetection means, and a third difference output indicative of a difference between outputs from said respective detector surfaces of said third photodetection means to calculate a difference between a value real number times larger than a sum of said second and third difference outputs and said first difference output to output a first light spot position signal, and to calculate a difference between said second and third difference outputs to output a second light spot position signal, gain control means for controlling gain so that the value of said second light spot position signal takes a predetermined value, an actuator for carrying out positioning of a light spot emitted by said light emitting means, and a servo control circuit adapted to input an output signal from said gain control means to control said actuator.

6. A tracking servo control system as set forth in claim 5, wherein said fixed spacing is equal to substantially one fourth of the distance between the axes of the adjacent recording tracks.

7. A tracking servo control system as set forth in claim 5, wherein said operation means comprises:
a first subtracter for calculating a difference between outputs from the respective detector surfaces of said first photodetection means,
a second subtracter for calculating a difference between outputs from the respective surfaces of said second photodetection means,
a third subtracter for calculating a difference between outputs from the respective detector surfaces of said third photodetection means.
an adder for calculating a sum of outputs from said second and third subtracters,
a multiplier for multiplying an output from said adder by a real number,
a fourth subtracter for calculating a difference between the output from said first subtracter and an output from said multiplier, and
a fifth subtracter for calculating a difference between the outputs from said second and third subtracters.

8. A tracking servo control system as set forth in claim 5, wherein said gain control means comprises:
a first voltage controlled amplifier adapted to input a second light spot position signal to amplify the inputted second light spot position signal in accordance with a control signal inputted thereto,
an operation or computing element adapted to input an output voltage from said first voltage controlled amplifier and a reference voltage set in advance to make a comparison therebetween to output a control signal corresponding to said difference to said voltage controlled amplifier, and
a second voltage controlled amplifier adapted to input said first light spot position signal and said control signal outputted from said operation means to amplify the inputted first light spot position signal in accordance with said control signal.

* * * * *